United States Patent [19]

Maya et al.

[11] Patent Number: 5,777,431
[45] Date of Patent: Jul. 7, 1998

[54] SUBSTANTIALLY FLAT COMPACT FLUORESCENT LAMP

[75] Inventors: Jakob Maya, Brookline; Munisamy Anandan, Burlington, both of Mass.

[73] Assignee: Matsushita Electric Works R&D Lab., Woburn, Mass.

[21] Appl. No.: 291,887

[22] Filed: Aug. 17, 1994

[51] Int. Cl.$^6$ .................... H01J 17/04; H01J 61/067
[52] U.S. Cl. .................... 313/493; 313/577; 313/610; 313/634; 313/635
[58] Field of Search .................... 313/493, 573, 313/610, 634, 635, 577

[56] References Cited

U.S. PATENT DOCUMENTS

| | | | |
|---|---|---|---|
| 2,405,518 | 8/1946 | Polevitzky | 313/493 |
| 2,406,146 | 8/1946 | Holmes | 313/493 X |
| 2,501,376 | 3/1950 | Breadner et al. | 313/493 X |
| 2,555,749 | 6/1951 | Krefft | 313/493 |
| 3,226,590 | 12/1965 | Christy | 313/493 |
| 3,243,630 | 3/1966 | Martyny | 313/493 |
| 3,247,415 | 4/1966 | Martyny | 313/493 |
| 3,258,630 | 6/1966 | Scott | 313/493 |
| 3,646,383 | 2/1972 | Jones et al. | 313/493 |
| 4,839,555 | 6/1989 | O'Mahoney | 313/493 |
| 5,041,762 | 8/1991 | Hartai | 313/493 X |
| 5,343,116 | 8/1994 | Winsor | 313/493 |

*Primary Examiner*—Ashok Patel
*Attorney, Agent, or Firm*—Jerry Cohen

[57] ABSTRACT

A substantially flat, gas filled, arc discharge fluorescent lamp having an internal path in which the arc travels, where the path is formed by vertical sections between a substantially flat top and bottom surface. The path length can be controlled along with the height of the lamp to provide a wide range of lumens per unit volume while improving lamp life at low cost. A reflective coating, formed adjacent to the phosphor coating within the path, directs light to where wanted, while obviating the need for a separate reflector in the lamp fixture. One application of the present inventive lamp is to replace incandescent lamps by virtue of being mechanically interchangeable by virtue of having the flexibility for accommodating a small ballast within the lamp assembly.

5 Claims, 7 Drawing Sheets

DOWN LIGHT

SUBSTANTIALLY FLAT COMPACT FLUORESCENT LAMP

FIELD OF THE INVENTION

The present invention relates generally to compact fluorescent (CFL) lamps, and more particularly to substantially flat compact, gas filled, arc discharge, fluorescent lamps.

BACKGROUND OF THE INVENTION

As is well known, CFLs are fluorescent lamps that have been bent several times to make them more compact and fit into a smaller space. There are several objectives to this exercise. One is to make them small so as to replace incandescent lamps (IL). The leading reason for replacing incandescent bulbs with CFLs is cost. Typically, the efficiency of an IL is 16 lumens per watt (1 pw) of electrical energy input; while a CFL provides, typically, 50–60 1pw. Substantial energy savings and, therefore, cost savings are achievable by replacing ILs with equal lumen producing CFLs. Furthermore, ILs last only about 750 hours; while CFLs last anywhere from six to ten thousand hours. In commercial establishments where one has to pay labor to change light bulbs, the less often a bulb needs to be changed the more (measurably) economical the installation becomes. Finally, electric utilities have been for some time interested in reducing the peak load demand by supporting energy conservation. This is because it is very costly to build additional peak power generating facilities (power plants) to accommodate the peak load. Therefore, utilities have found it more economical to support energy saving devices to reduce peak load. This is called Demand Side Management or DSM. These DSM programs have given a large boost to the entire field of CFL for at least the last ten years.

A smaller, longer lasting, higher efficiency, lower price lamp is a continuing industry need. However, as in every other lamp system, CFL involves also a tradeoff among many parameters. Often it is impossible to optimize all the parameters simultaneously. For example, the smaller the size, the less the efficiency and often the higher the cost. The large installed base of incandescent bulbs requires that fluorescent replacements for incandescent bulbs fit into the existing bulb holders, and these bulb holders and the general environment around the incandescent bulbs is substantially smaller than the environment that existing fluorescent bulbs need. Such problems have slowed the conversion of incandescent to fluorescent bulbs.

As the required size gets smaller and smaller, there are several limitations or tradeoffs that need to be made. For example, as the size is reduced heat removal becomes a problem. Heat has to be removed so as to maintain an optimum mercury vapor pressure for optimum efficiency. Similarly, as size is reduced the phosphor loading (current density per surface area of phosphor or power per surface area of phosphor) increases leading to faster phosphor light output deterioration. Again, as size is reduced (due to the difficulty of heat removal) electrical components in the base of the lamp tend to get very hot which leads to shorter life for the lamp.

Attempts to solve many of these problems include coating the phosphors with alumina to reduce phosphor deterioration. Attempts to solve the heat problem in CFL include using amalgams, perforated outer jackets, heat transfer conduits, etc. In many cases, some of these solutions have been reasonably successful for limited ranges of operation. As the lumen package is increased, in other words, as one requires more lumen output from the same size package the problems become more and more severe and additional compromises have to be made.

Known compact fluorescent lamps simply bend the typical glass tube in U-shaped or circular forms to minimize the volume. In these cases, the phosphor coats over the entire inner surface of the glass tube, and electrodes are attached at each end of the tube. Extensions of this basic design are the Double-U, Triple-U and Quadruple-U which are simply the joining of the basic-U. These compact fluorescent lamps tend to be long to maintain the arc length required for the desired light output. Further, an external reflector (fixture) is needed if these are to be employed for preferential directional lighting.

Another application where substantially flat fluorescent lamps are used is related to the expanded use of lap-top personal computers. With the advent of Liquid Crystal Displays (LCDs) for these lap-top computers, the demand for Area-lamps of flat fluorescent lamps increased. This increase is due to LCDs requirement for some form of backlighting. The stringent requirements for this application are: (i) the lamp needs to be flat with either a rectangular geometry or a square geometry, (ii) the brightness over the lamp surface has to be uniform, (iii) the dimming ratio should be >1000:1. The current practice is to use a tubular lamp bent in a serpentine fashion and employ a diffuser over the lamp. Another technique uses one or two straight tubular conventional fluorescent lamps at the edges of a light conducting and distributing element to diffuse the light in the form of a flat sheet or slab. Yet another technique is to arrange an array of sub-miniature tubular fluorescent lamps in X-Y plane and assemble a diffuser in front and a reflector at the back. Yet another technique employs two flat glass plates which are coated with phosphor on the inner side of the plates and sealed around the periphery enclosing two electrodes. These large area lamps require mechanical reinforcing elements to support the structure under low pressures encountered both during processing and gasfilling.

"Substantially flat", herein is defined as an application specific specification. In a lap-top computer, the requirements of the lamp may be measured in millimeters or less, while in an overhead lighting fixture for general lighting purposes the requirement may be measured in centimeters or more.

U.S. Pat. No. 3,266,590 to Christy, employed a large area substantially flat fluorescent lamp called the "panel-lamp", that consisted of two corrugated glass plates laid over each other and sealed to withstand the atmospheric pressure. By virtue of its corrugation and seal pattern, an electrical discharge path in the shape of a serpentine or labyrinthine was generated. A similar corrugated structure was adopted for a round, substantially flat lamp, as shown in U.S. Pat. No. 3,243,630 to W. C. Martyny, with a central hole through which no light was generated.

Lamps made in accordance with the above patents are not practical for retrofitting into incandescent lamp applications.

An object of this invention is to overcome the above illustrated limitations and problems by providing a substantially flat compact fluorescent lamp with an integral reflector.

Another object of this invention is to provide a substantially flat, elongated fluorescent lamp bulb with lower cost and longer life at the same lumen output as prior art lamps.

Yet another object of this invention is to provide a fluorescent lamp suitable for replacing incandescent lamps, where the fluorescent lamp fits into the same physical setting as the incandescent lamp.

3

And yet another object of this invention is to replace bulky fluorescent lamps such as circline with more compact fluorescent lamps so as to have smaller and more efficient fixtures.

SUMMARY OF THE INVENTION

In a preferred embodiment the lamp as defined above includes a side surface joining the top and bottom surfaces around the peripheries of the top and bottom surfaces.

Also, the above wall structure may include vertical sections, said sections constructed and arranged such that the path cross section is rectangular with a horizontal dimension, a vertical dimension, and where the path length from end to end is substantially determined by the horizontal dimension.

In the lamp described above the horizontal dimension, the wall thickness, the area of the top inner surface, and the vertical height are selected to provide for a range of lumens per chamber volume of from about 70 lumens per cubic inch to about 280 lumens per cubic inch.

In addition the above lamp may further include a wall structure with rounded sections joining the top and bottom surfaces, said rounded sections constructed and arranged to provide strength. A reflective surface may be distributed on one side of the phosphor coating such that light striking the reflective coating is directed back towards the opposite side of the phosphor coating.

This invention provides a more compact package at comparable performance to the existing CFLs currently on the market. This is the so called Flat Compact Fluorescent (FCFL) lamp approach which gives a reasonable arc length and power coupling into the discharge without the necessity of bending tubes many times; which is the typical approach taken by current CFLs.

Other objects, features and advantages will be apparent from the following detailed description of preferred embodiments thereof taken in conjunction with the accompanying drawings in which:

DESCRIPTION OF THE PREFERRED EMBODIMENTS

Figure 1:
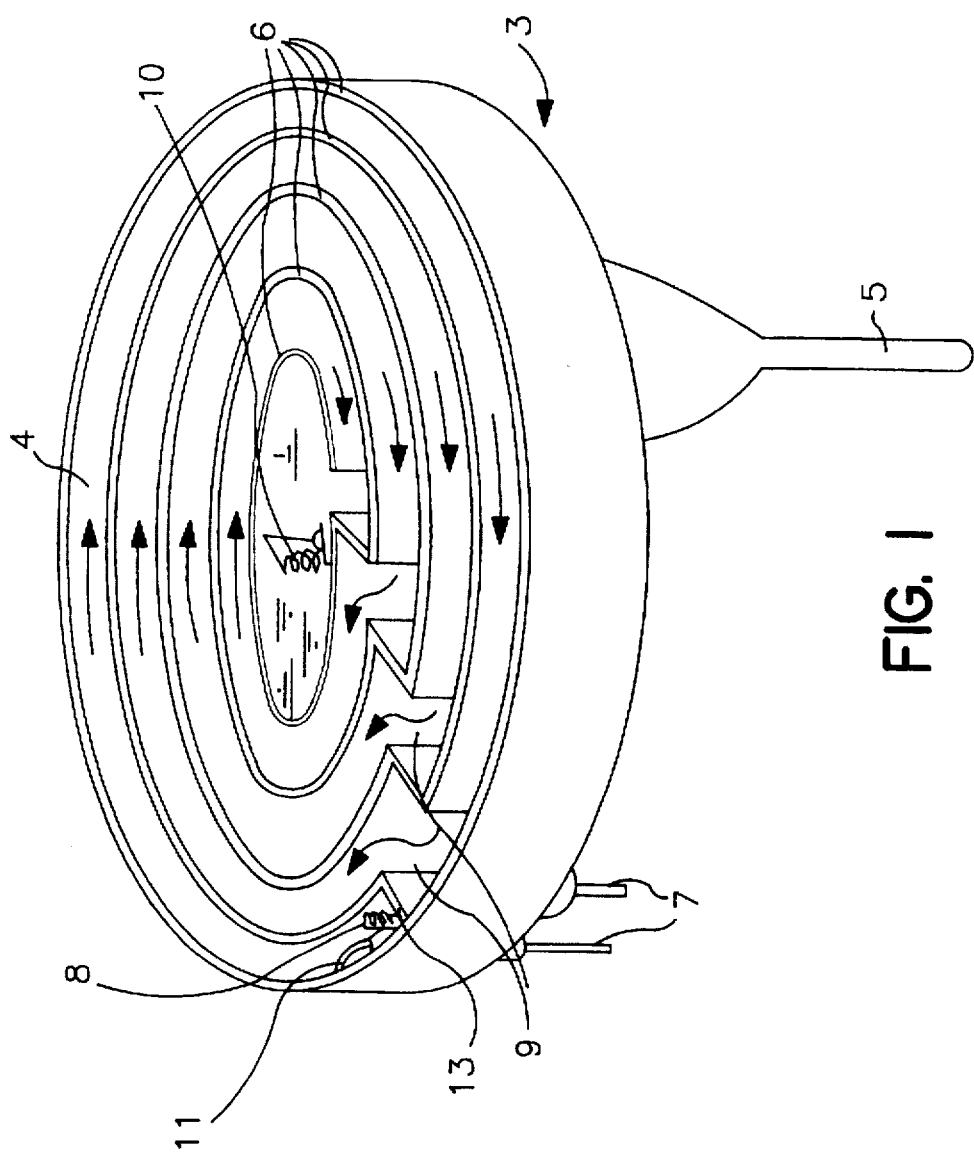
FIG. 1 is pictorial view of a preferred embodiment of the present invention in the form of a rounded lamp.

FIG. 1 shows a flat round lamp bulb 2. The top surface of the bulb is not shown so that the square or rectangular channel or path 4 is viewable. There are concentric rings 6 that rise vertically from the bottom surface 3. There are slotted openings 9 in each ring except the outside ring and a back discharge suppressor 13 joining each ring with the adjacent rings. The combination forms a continuous arc path from electrode 8 to electrode 10.

4

Figure 2:
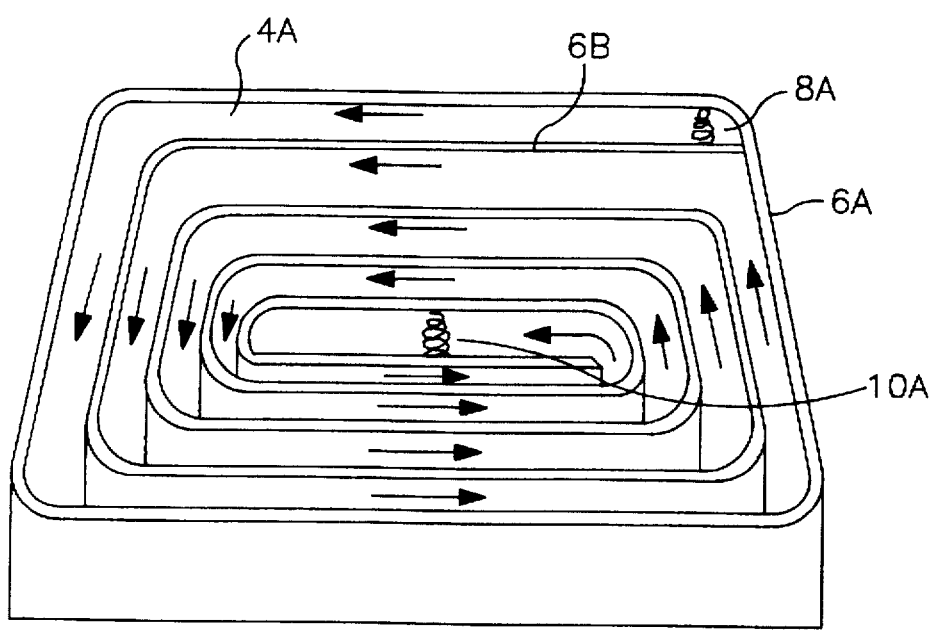
FIG. 2 is pictorial view of a preferred embodiment of the invention similar to FIG. 1, but in a square form.

FIG. 2 shows a version of a flat lamp similar to that in FIG. 1 with an outside wall 6A, and an internal wall 6B. In this preferred embodiment the internal wall 6B is formed in one continuous strip that is bent into the square structure forming a rectangular pattern of channels or paths 4A. The channels lead from one electrode 8A to the other electrode 10A.

Figure 3:
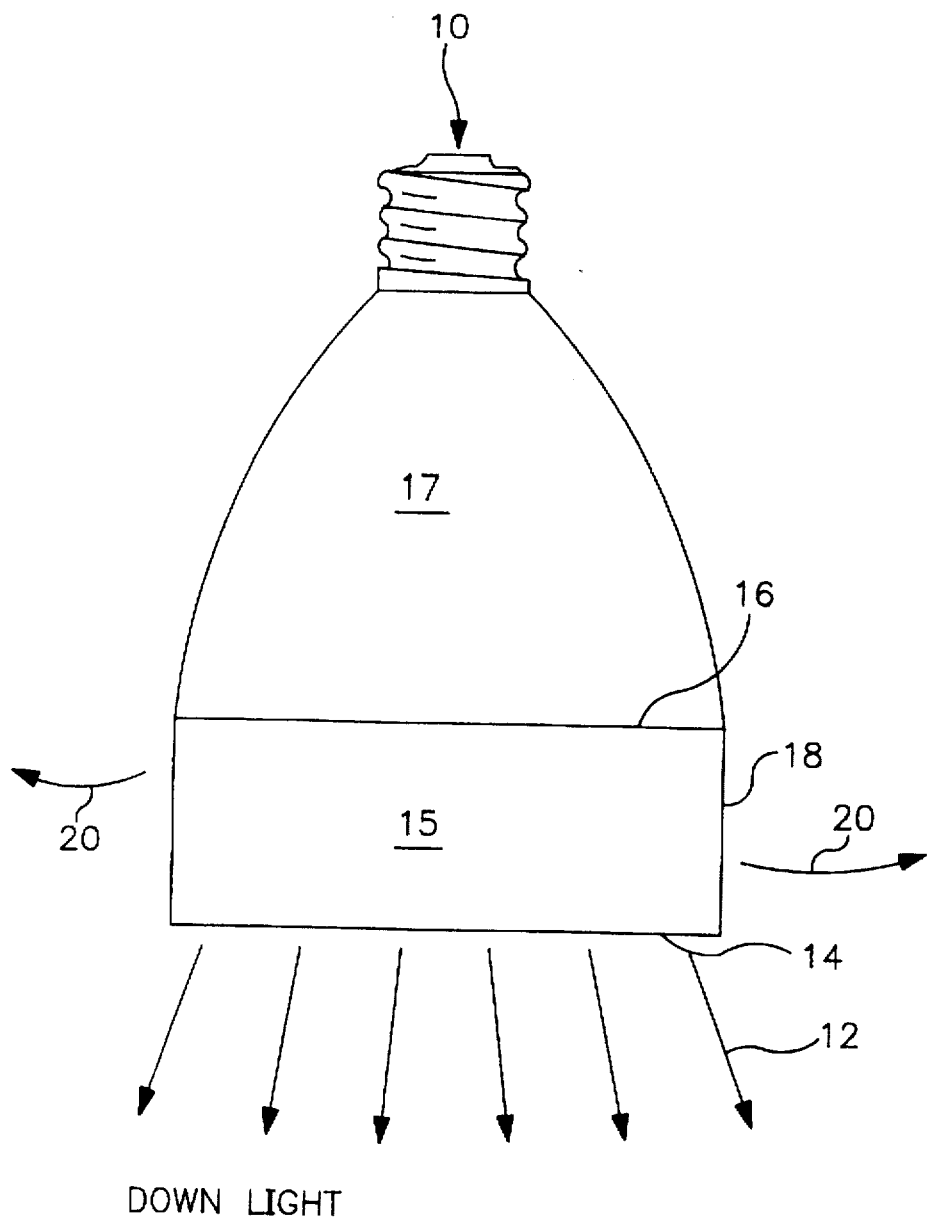
FIG. 3 is pictorial view of a preferred embodiment of the invention in the form of a directional lamp.

FIG. 3 shows a unidirectional lamp 10 preferred embodiment of the present invention formed into a package of equal size and shape to an incandescent bulb. The lamp bulb itself 15 may be of the type shown in FIG. 1 or FIG. 2 with the ballast 17 attached to the top surface 16 of the bulb.

As shown in FIG. 1, the flat lamp approach taken avoids bending of glass tubing, which inherently is a slow process, and relies more on frit sealing. As such, the manufacturing process is inherently amenable to batch processing rather than a continuous in-line process. As can be seen from FIG. 1, the arc length, fallows the channel or path 4, and is about thirty-two inches long which is equivalent to about 5 twin tube CFL of 7 W (watt) variety or 35 W CFL of equivalent light output, if the efficiency is comparable. Two electrodes 8 and 10 are positioned at or near the two ends of the path or channel 4 and electrical connection leads 7 are provided for making electrical connections. As described later, an exhaust tubulation 5, is formed in the glass bottom, and a mercury getter ring 11 is connected to an electrode 8.

It is worth noting that FCFLs tend to collapse when evacuated unless there are structures that can take up the pressure inside. In our particular case, the wall structures 6 are not only convenient but necessary so as to increase the arc length. Therefore, we do not experience any cracking due to pressure on the flat piece of glass.

There are several advantages of FCFLs whether the circular type as shown in FIG. 1 or the rectangular one, as shown in FIG. 2, or any other shape that can be conceived of by those well versed in the art of lamp making. One of the advantages over, say bent glass tube types, is that a single surface of glass whether circular or flat can be coated on either side to generate visible radiation. Therefore, compared to two walls of glass in a bent tube, this feature saves space and is less expensive. This, of course, is true only for the inner channels. The outer ring or surface is coated only on its inside surface. Furthermore, a rectangular cross section discharge channel always gives a larger surface area than a circular one. This is important because the larger the surface area of the phosphor, for the same power loading, the better the lumen maintenance and the phosphor suffers less deterioration. The rate at which phosphors lose luminosity determines the life of the lamp. Therefore, everything else being equal, or essentially so, a flat lamp with rectangular arc cross section is likely to have better maintenance or live longer when compared with a tubular or bent tube CFL of equal lumen output. Alternatively, of course, one can increase the power loading in the FCFL to equal the power loading in the bent tube approach resulting in the same maintenance and life but higher lumens per unit volume. This leads to a fundamentally more compact CFL. This is one of the advantages of the flat lamp approach.

Another advantage of the FCFL is the fact that one surface is entirely flat, underneath which a ballast could conveniently be placed. Then an incandescent socket would make the whole lamp a direct retrofit for a unidirectional incandescent lamp 10. This is shown in FIG. 3. Now, since light normally outputs in all directions from the phosphor, it would be more efficient to direct all the light 12 through the bottom surface 14 by placing a reflector on the ballast side 16. A reflective surface may also be placed on the side surfaces 18, or alternatively, the sides may be structured to allow light 20 to leave. Since many conventional CFL's use separate, external reflectors, the internal reflector of the present invention will result in savings on the fixture, since the fixture, if needed at all, need not be a very efficient reflector.

Figure 4:
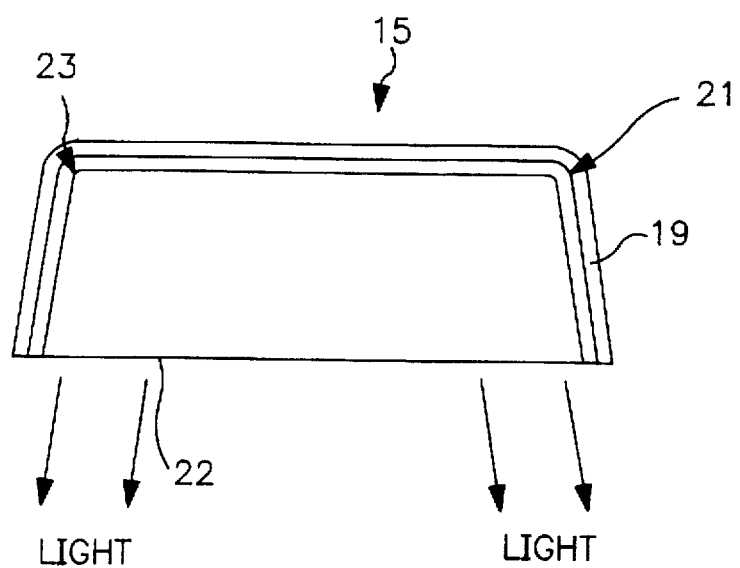
FIG. 4 and FIG. 5 are cross section views of the phosphor/ reflective coatings usable in any of the FIGS. 1–3 forms.

FIG. 4 shows a cross section of the outside surface of the lamp bulb with the internal walls not shown. The inside surface of the glass 19 is coated with a reflecting layer 21 that is, in turn, coated with the phosphor layer 23.

Figure 5:
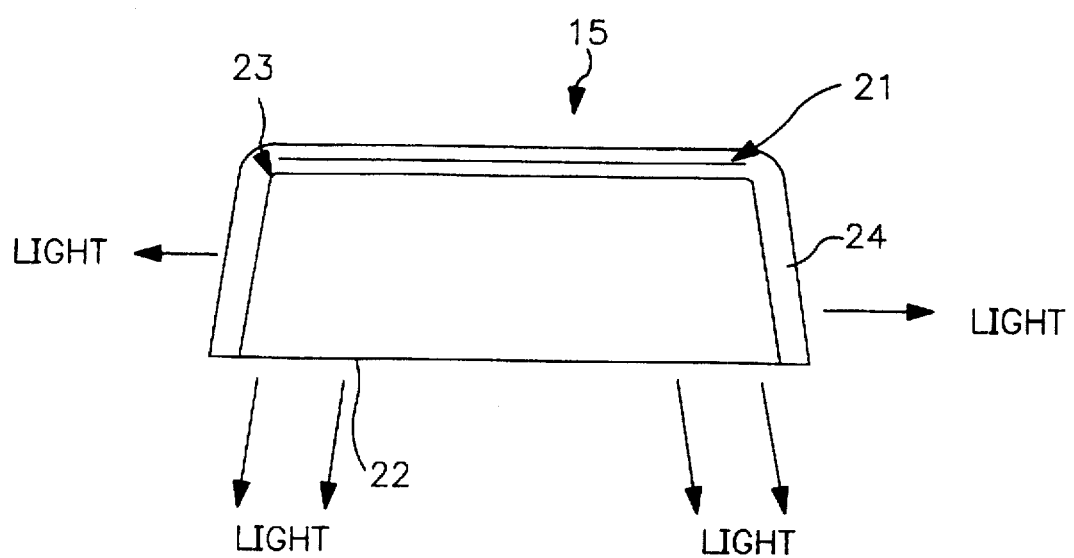

FIG. 5 shows the lamp bulb of FIG. 4 except that the reflective coating 21 does not extend around the side surface 24 of the bulb. The phosphor layer 23 extends over the entire inner surface and light is allowed to exit through the side as well as the bottom or front surface.

An FCFL offers the choice of introducing a reflecting film such as $Al_2O_3$ or $SiO_2$ to reflect the UV and visible light, so as to direct all the light through the top surface and/or through the top and side walls. Therefore, we can design a directional downlight or diffuse light source depending on where we introduce the reflector films. In FIG. 4, a design is shown where all the light exits through the front surface 22 and in FIG. 5 a design is shown where the light exits through the side wall 24 and the front surface. This kind of flexibility is not found in the bent tube approach of prior art CFLs.

Figure 6:
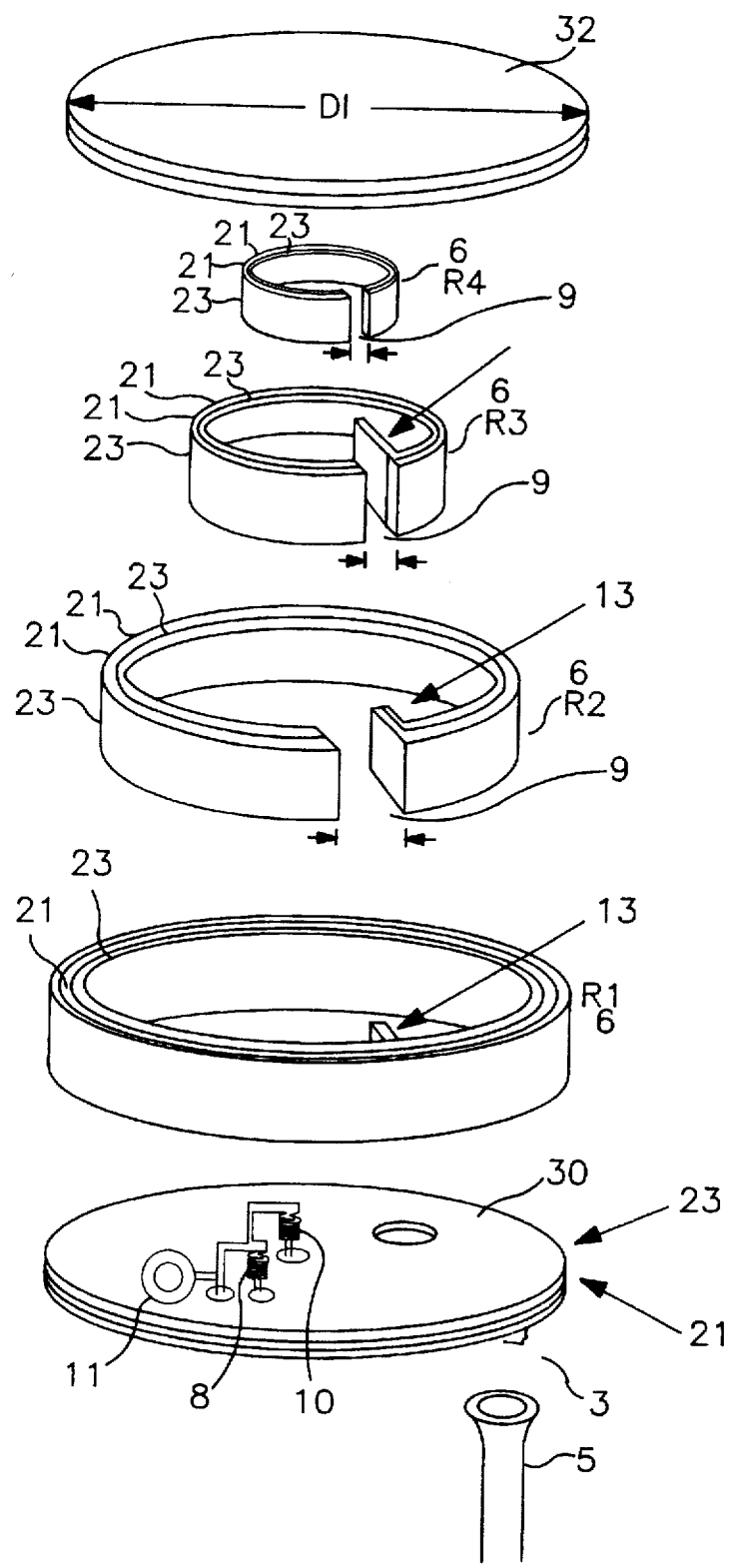
FIG. 6 is an exploded view of a preferred embodiment substantially corresponding to the FIG. 1 format.

FIG. 6 shows the parts of a lamp bulb of FIG. 1 with the pieces separated to show the relationship of each piece to the other. The finished bulb is formed by compressing the viewing plate 32, and the rings R4, R3, R2, and R1 onto the cathode plate 30. The slots 9 and the back discharge suppressors 13 are aligned to form the continuous path 4 of FIG. 1, and each ring becomes the wall 6 of FIG. 1.

With reference to FIG. 6, an exploded view, a typical rendering to practice of this lamp is as follows (variations are possible):

Four glass rings, R1, R2, R3 and R4 are cut out of soda-lime glass tubings with inner diameters of 72 mm, 49 mm, 32.5 mm and 15 mm, respectively. All the rings had a height of 25.4 mm. Except for R1, all the other rings are slotted to have a side opening of width 10 mm (R2), 7 mm (R3) and 6 mm (R4). The rings are precleaned and coated with $Al_2O_3$ on both the inner and outer surfaces except for the ring R1 which is coated on the inner surface only. Frit glass paste is applied to the edges of these rings and the rings are attached to the viewing plate in a concentric pattern. Back discharge suppressor plates of soda-lime glass are attached to the respective rings with the help of frit glass and the sub-unit is sealed at a temperature of 450° C. The outer channel had a channel width of 10.5 mm and the other two inner channels are of 7.5 mm wide. The internal surfaces of the sub-unit is coated with phosphor, and the phosphor is baked for organic burn-out. The free edges of the rings are cleaned free of phosphor and frit glass paste is applied all along the edges and dried.

The preparation of the cathode active plate 30 is completed in the following sequence:

(i) A circular plate of soda-lime glass with a diameter D1 of 76.2 mm and thickness of 3 mm is cut.

(ii) Two pairs of holes of diameter 2.3 mm are drilled at designed locations on the plate for mounting two filament electrodes, and the third hole of the same diameter is drilled at a pre-determined site for attaching an exhaust tubulation.

(iii) Two pairs of leads of Ni Fe—Cr alloy are heat-treated and frit sealed through the two pairs of holes.

(iv) $Al_2O_3$ is selectively coated over the plate and baked for organic burn-out.

(v) Phosphor is coated over $Al_2O_3$ and baked for organic burn-out.

(vi) Triple carbonate coated filaments are welded to the pairs of leads sealed-in along with an Hg dispensing getter.

The sub-unit and the active plate are placed in alignment, and the edges of an exhaust tubulation is applied with frit-glass and laid over the exhaust hole in the active plate. A sealing pressure is applied over the entire assembly and is frit-sealed inside an oven at a temperature of 450° C.

The sealed unit is exhausted through a special exhaust procedure and filled with argon gas and mercury. After sealing off the lamp from the exhaust system, the lamp is subjected to an aging procedure for stabilization.

The performance characteristics of the lamps, built with the process as described above, are as follows: When the lamps are at ambient temperature of 25° C., the typical lamp voltage is about 75 V. at 200 ma for a lamp power of 13.6 W. The lamps exhibit the normal fluorescent volt-ampere characteristics such that by changing the ballast reactance the lamp current and thereby the lamp voltage changes.

Many variations from this particular design and process are available to those of ordinary skill in the art. The number of channels or paths can be increased or decreased without substantially changing the outer dimensions of the lamp bulb. This would change the lumen package. Similarly, the height of the lamp can be altered depending on the needs. As the height is reduced, at the same current, the amount of power that can be coupled is increased leading to higher lumen output.

Figure 7A:
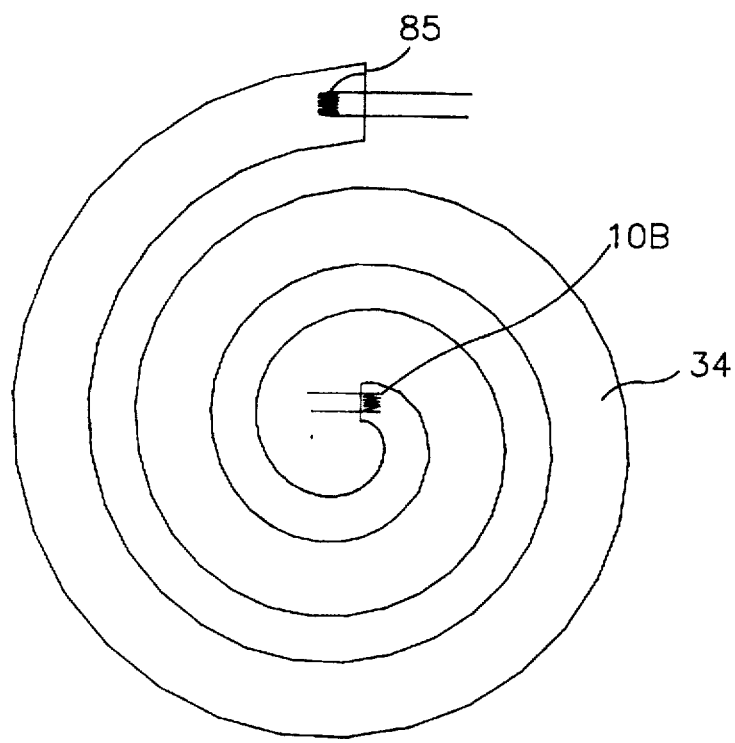
FIG. 7 is top/side/cross-section view of the channel or path of a preferred embodiment substantially corresponding to the FIG. 1 format.
Figure 7B:
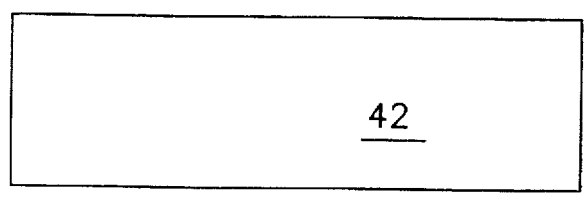
Figure 7C:
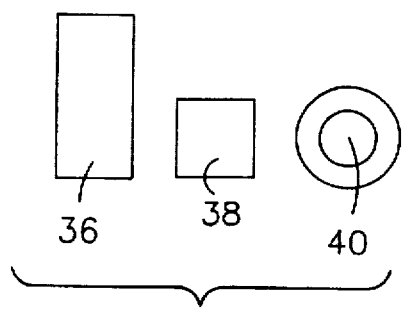

FIG. 7 shows other preferred embodiments where the inner channels may be formed of a single tube 34 of rectangular 36, square 38 or rounded 40 cross section that has been shaped into a flat spiral 42. The electrodes BB and 10B are shown at the ends of the tube, but, in other preferred embodiments, the electrodes may be placed in other locations anywhere in the bulb to allow the lamp designer to optimize or specialize the performance of the lamp.

Frit sealing, as descried above, is used to make small quantities, but for mass production other processes may be used as is known in the art.

One typical approach to frit sealing is the "glass-molding" technique wherein the rings 6, the electrode plate 30, the exhaust tubulation 5 (of FIG. 6), and the electrode leads 7 (of FIG. 1) are molded to form one piece and the other substantially flat plate 32 through which light exits is molded to form another piece. The free edges of the integral rings of the first piece are press-fit onto the corresponding recesses in the second molded piece. Both pieces are sealed at the periphery.

In other preferred embodiments the lamp bulb may contain any kind of phosphor or phosphor mix and any kind of rare gas or rare gas mix at any pressure plus a mercury drop of any weight or a mercury amalgam of any composition.

In other preferred embodiments, the bulb is covered with visible and ultraviolet radiation reflecting material, such as $Al_2O_3$, $SiO_2$, etc., everywhere except the viewing surfaces.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A substantially flat, arc discharge, fluorescent lamp structure comprising:

means defining a gas filled chamber, which is atmospheric-sealed and has a top glass wall with inner and outer surfaces and a peripheral edge, said top wall being opaque to fluorescent light, means defining a bottom glass wall of the chamber with inner and outer surface, said bottom wall being transparent to fluorescent light means defining a phosphor layer on the inner sides of both said top and bottom walls, means defining a side-wall glass structure sealingly connecting the top and bottom walls at an enclosing periphery of said walls and within such periphery in a tortuous path, said side wall structure being constructed, arranged to form a discharge path a having a surface layer of phosphor thereon, and means defining two electrodes dispersed in operative relation to said chamber for establishing and maintaining an arc therein, all the said lamp structure, as a whole, being constructed and arranged so that said arc between said electrodes is directed along said discharge path.

2. A lamp as defined in claim 1 where the side-wall structure comprises vertical sections connecting peripheral edges of the top and bottom walls and also spanning the chamber between top and bottom walls at other locations, said vertical sections being composed essentially of concentric circles, each with an annular gap and with spanning radial walls connecting next adjacent such circles and serving as back discharge suppressors and constructed and arranged to define an elongated discharge path cross section within the chamber that is rectangular.

3. A lamp as defined in claim 2 wherein the horizontal dimension, the wall thickness, the area of the top inner surface, and the vertical height are selected to provide for a range of lumens per chamber volume of from about 70 lumens per cubic inch to about 280 lumens per cubic inch.

4. A lamp as defined in claim 1 further wherein vertical side wall structure comprises rounded sections joining the top and bottom walls, said rounded sections constructed and arranged to provide a path with a rounded cross section.

5. A lamp as defined in claim 1 further comprising a reflective surface partially distributed on one side of the phosphor coating such that light striking the reflective coating is directed back towards the opposite side of the phosphor coating.

* * * * *